Aug. 14, 1928.　　　　　　　　　　　　　　　　　　1,681,030
F. S. DUESENBERG
FLUID PRESSURE BRAKE SYSTEM
Filed April 1, 1924　　　5 Sheets-Sheet 1
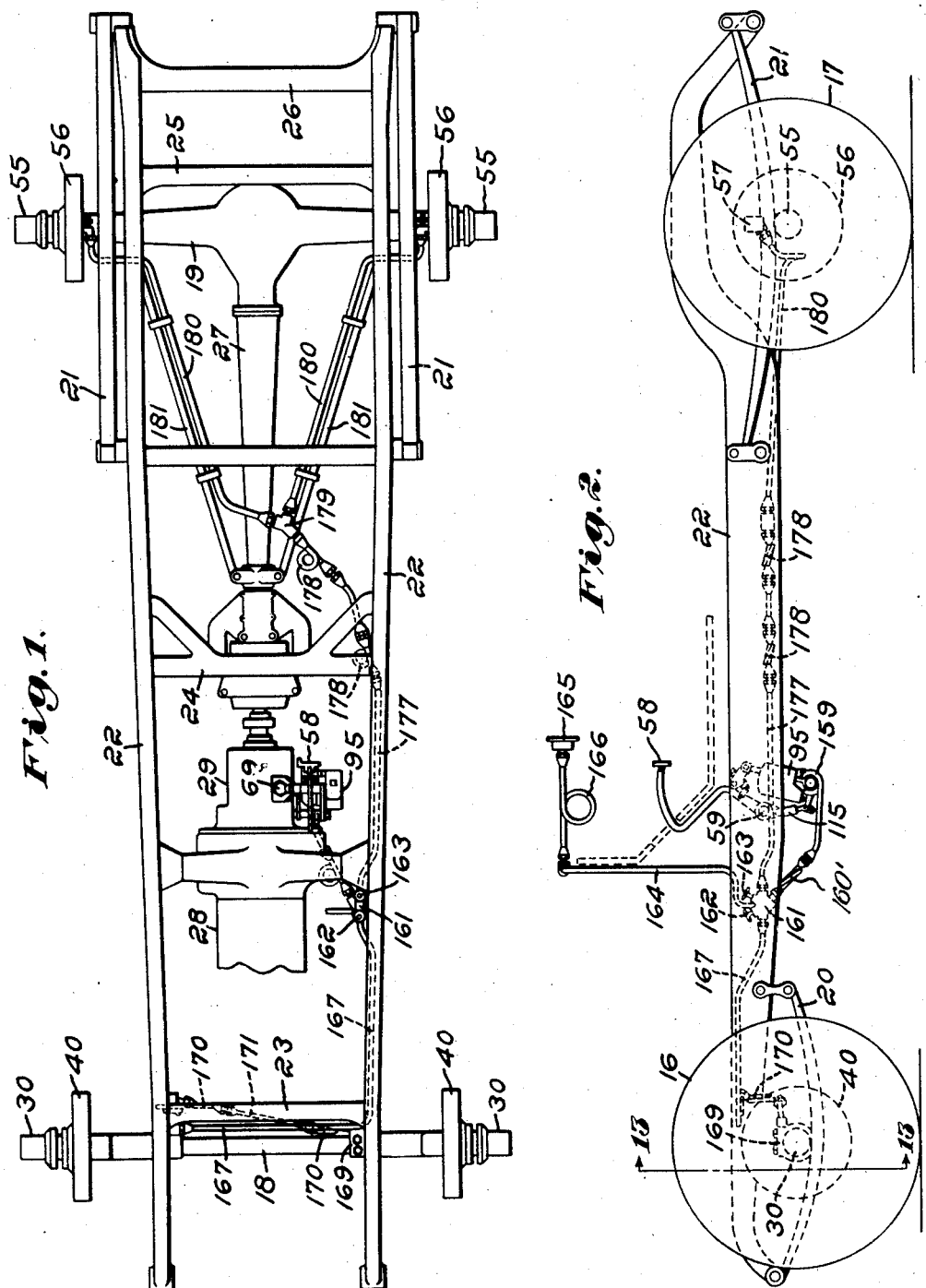
Inventor:
Frederick S. Duesenberg,
by Emery, Booth, Janney & Varney Attys.

Aug. 14, 1928.
F. S. DUESENBERG
1,681,030
FLUID PRESSURE BRAKE SYSTEM
Filed April 1, 1924   5 Sheets-Sheet 2
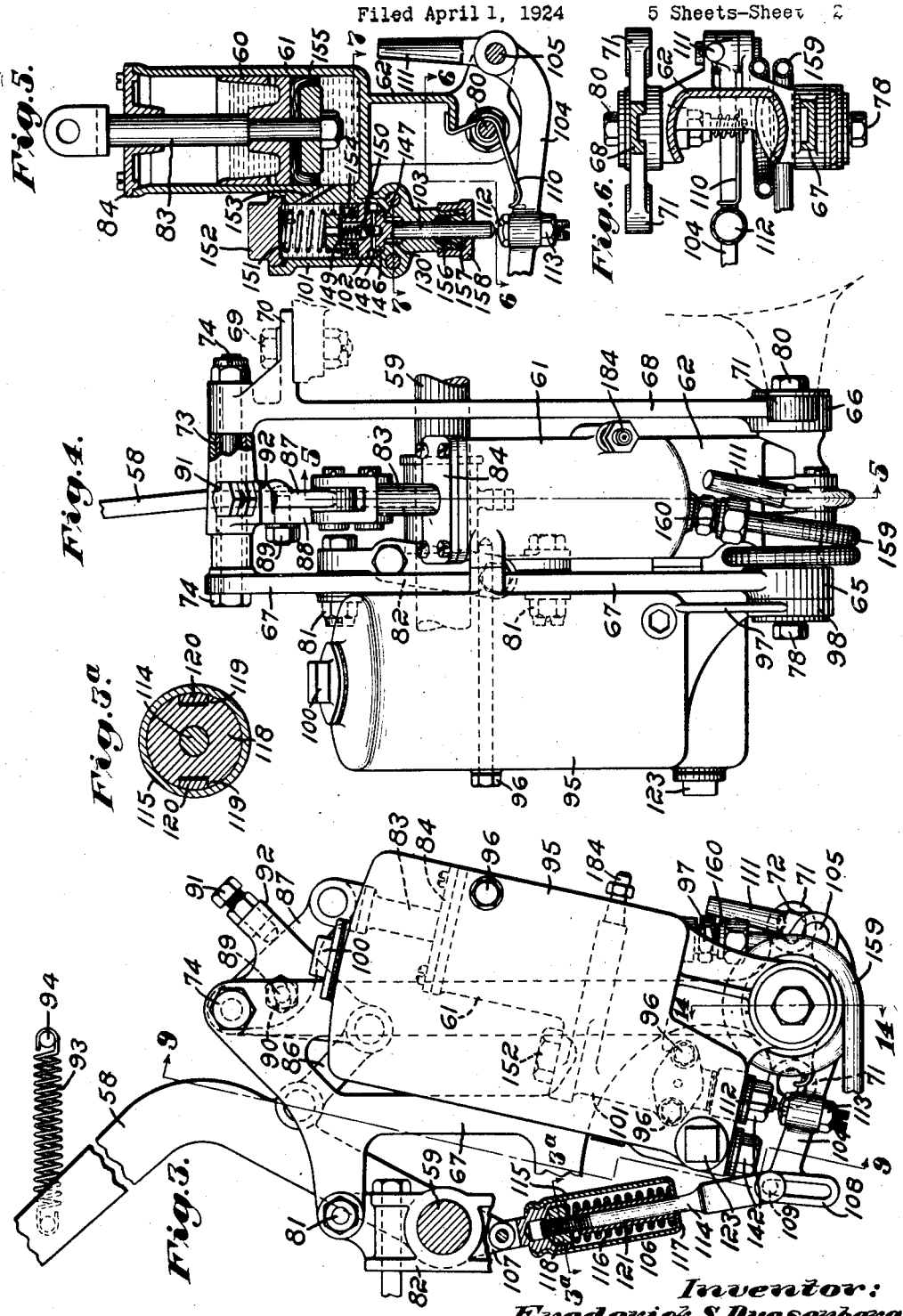
Inventor:
Frederick S. Duesenberg,
by Emery, Booth, Janney & Varney. Attys.

Aug. 14, 1928.
F. S. DUESENBERG
1,681,030
FLUID PRESSURE BRAKE SYSTEM
Filed April 1, 1924      5 Sheets-Sheet 3
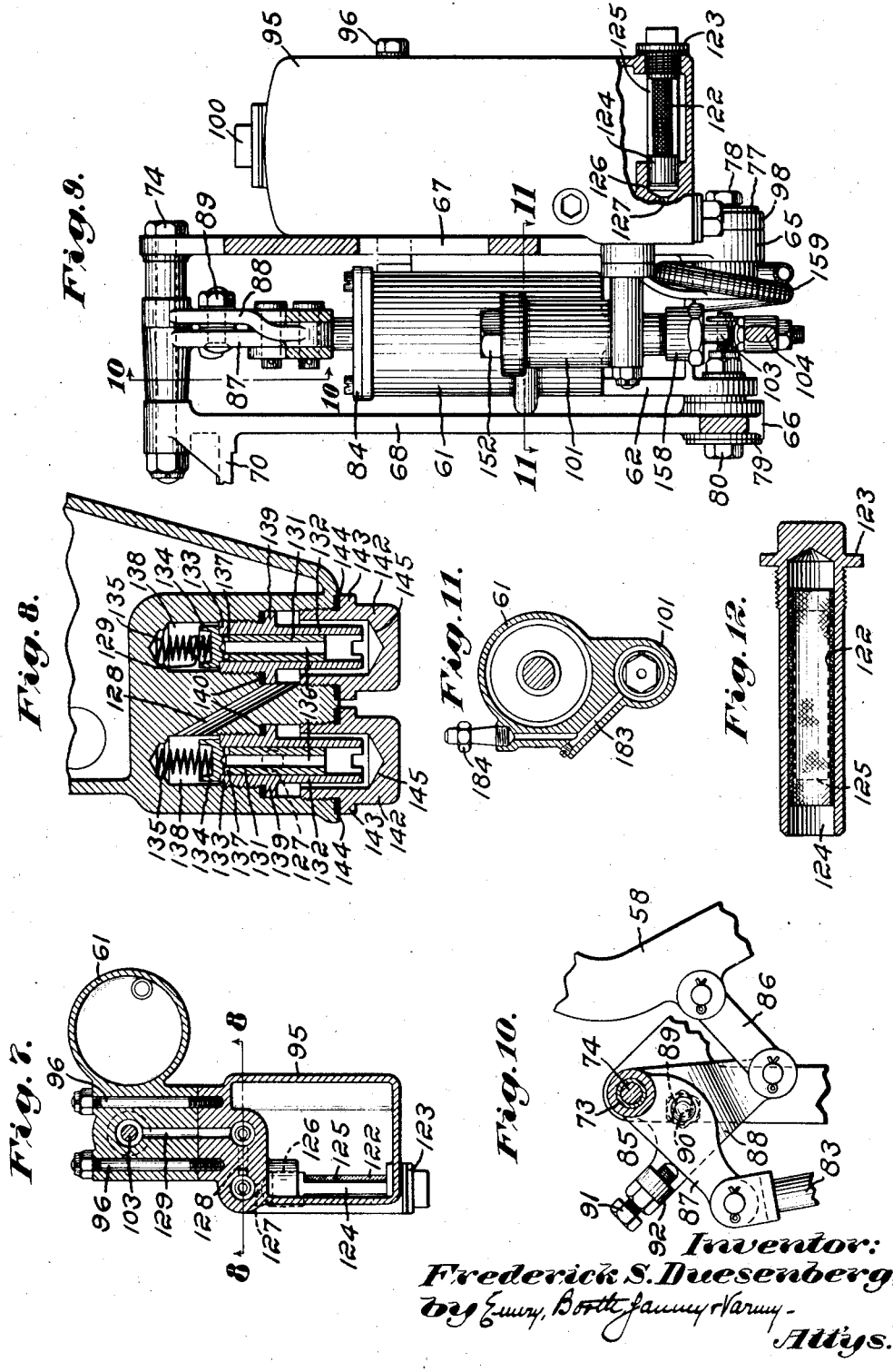
Inventor:
Frederick S. Duesenberg,
by Emery, Booth, Janney & Varney
Attys.

Aug. 14, 1928.

F. S. DUESENBERG 1,681,030

FLUID PRESSURE BRAKE SYSTEM

Filed April 1, 1924    5 Sheets-Sheet 4

Inventor:
Frederick S. Duesenberg,
by Emery, Booth, Janney Varney.
Attys.

Aug. 14, 1928.　　　　　　　　　　　　　　　　　　1,681,030
F. S. DUESENBERG
FLUID PRESSURE BRAKE SYSTEM
Filed April 1, 1924　　　　5 Sheets-Sheet 5

Inventor:
Frederick S. Duesenberg,
by Attys.

Patented Aug. 14, 1928.

1,681,030

UNITED STATES PATENT OFFICE.

FREDERICK S. DUESENBERG, OF INDIANAPOLIS, INDIANA, ASSIGNOR TO INDIANAPOLIS CORPORATION, OF WILMINGTON, DELAWARE, A CORPORATION OF DELAWARE.

FLUID-PRESSURE BRAKE SYSTEM.

Application filed April 1, 1924. Serial No. 703,421.

This invention relates to a novel and improved fluid pressure brake system having special utility in connection with steerable vehicles, such as motor cars, and particularly those whose front or steering wheels, as well as the rear or driving wheels are equipped with brakes.

The invention will be best understood by reference to the following description, when taken in connection with the accompanying drawings of one illustrative embodiment thereof, while its scope will be more particularly pointed out in the appended claims.

In the drawings:

Fig. 1 is a plan of a motor car chassis, equipped with a brake system exemplifying the invention;

Fig. 2 is a side elevation of the same;

Fig. 3 is a side elevation, partly in vertical section, on an enlarged scale, illustrating the master cylinder, brake-pedal and associated parts;

Figure 13:
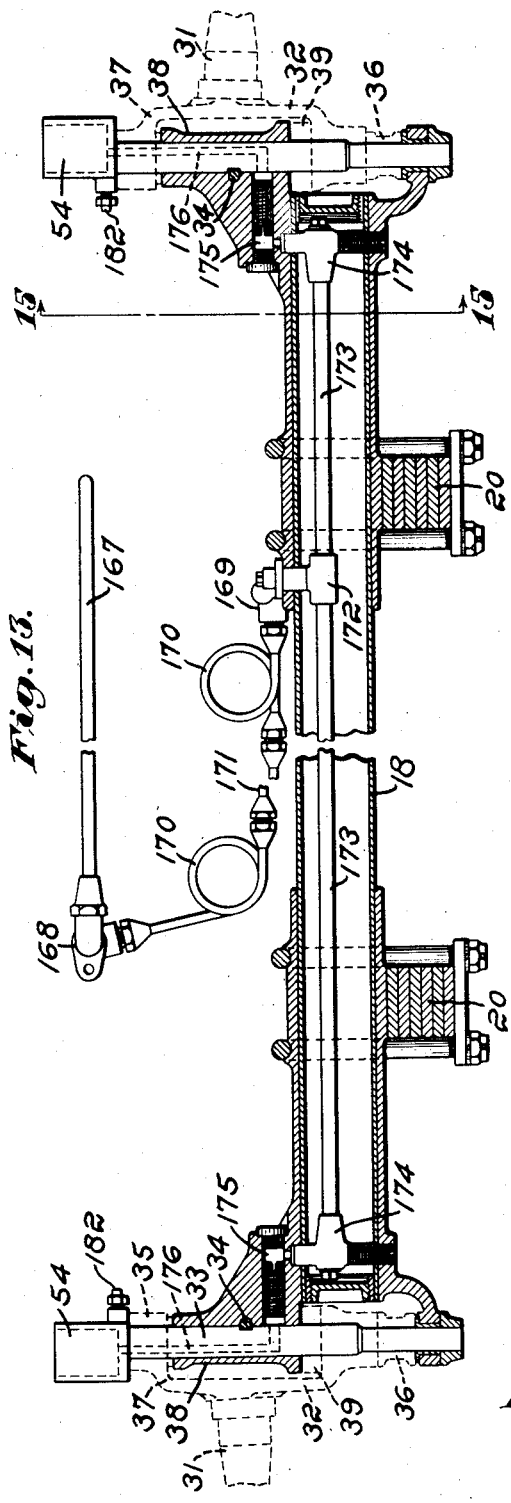
Figure 14:
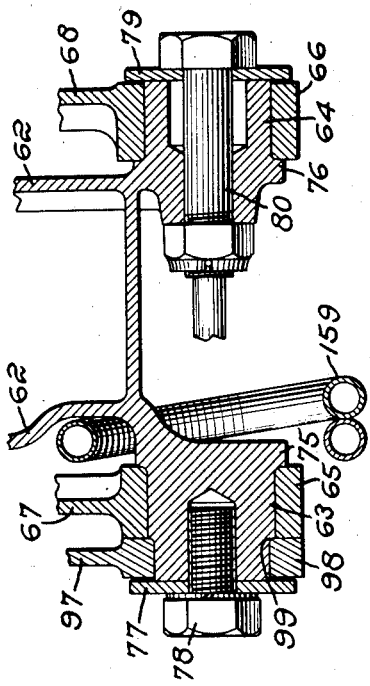

Fig. 3ª is a sectional view on an enlarged scale on line 3ª—3ª of Fig. 3;

Fig. 4 is an elevation, partly in vertical section, of the parts shown in Fig. 3;

Fig. 5 is a sectional view on line 5—5 of Fig. 4;

Fig. 6 is a sectional view on line 6—6 of Fig. 5;

Fig. 7 is a sectional view on line 7—7 of Fig. 5;

Fig. 8 is a sectional view on line 8—8 of Fig. 7;

Fig. 9 is a sectional view on line 9—9 of Fig. 3;

Fig. 10 is a sectional view on line 10—10 of Fig. 9;

Fig. 11 is a sectional view on line 11—11 of Fig. 9;

Fig. 12 is a detail, longitudinal section, illustrating the strainer for the liquid at the bottom of the reservoir;

Fig. 13 is a sectional view on line 13—13 of Fig. 2;

Fig. 14 is a sectional view on an enlarged scale on line 14—14 of Fig. 3; and

Figure 15:
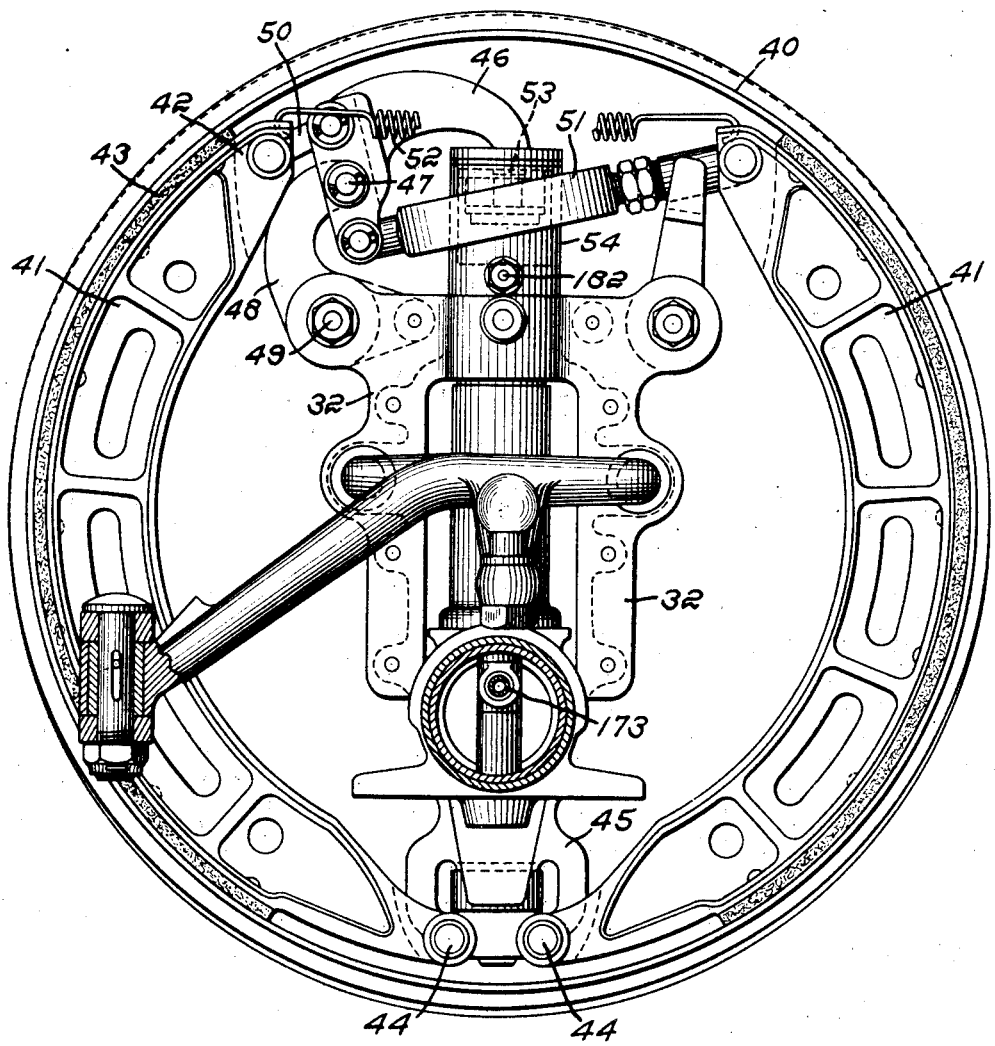

Fig. 15 is a sectional view on an enlarged scale on line 15—15 of Fig. 13.

Referring to the drawings, and to the embodiment of the invention which is selected for exemplification, there is shown in Figs. 1 and 2 a portion of the chassis of a motor vehicle, minus a part of the motor and a part of the steering gear. The chassis has a pair of front steering wheels 16 and a pair of rear driving wheels 17, conventionally represented in Fig. 2, front and rear axles 18 and 19, front and rear springs 20 and 21, and a spring-supported frame, the latter herein comprising a pair of side members 22 connected by cross members 23, 24, 25 and 26. Herein, a torque tube 27, secured to the rear axle housing, is pivotally connected at its front end to the cross member 24. A motor, a portion of which is shown at 28, is supported on the side members 22, and supports a clutch and transmission having a housing 29. The parts thus far described may be of any usual or suitable construction.

A part of the steering mechanism will now be described, reference being had at first to Fig. 1. Each of the front wheels may be provided with a usual hub 30, mounted to turn on a stub axle or spindle 31 (see Fig. 13), herein formed as a part of a steering knuckle 32, the latter being suitably pivoted on the axle 18, as by the provision of a pivot 33, herein secured to the axle by a pin 34. The steering knuckle herein is provided with upper and lower bearings 35 and 36, and has intermediate these bearings a recess 37, which receives a boss 38 formed on the end of the axle 18. In the present example, this boss rests upon an anti-friction thrust bearing 39, which contributes to the ease of steering of the vehicle.

Suitably secured to the wheel hub is a brake-drum 40, and enclosed by the latter is a brake-shoe or shoes, herein exemplified by a pair of brake-shoes 41 (see Fig. 15), having terminals 42. These shoes are preferably provided with usual brake linings 43. The brake shoes are mounted on pivots 44, carried by a carrier 45, which turns in unison with the steering knuckle.

The brake-shoe actuating mechanism will now be described, reference being had to the upper portion of Fig. 15. A lever 46 is fulcrumed at 47 on a floating support, such as the lever 48, mounted on a pivot comprising a stud 49 on the steering knuckle 32. The lever 46 is connected to the terminals of the brake-shoes 41 by links 50 and 51, at opposite sides, respectively, of the fulcrum 47, about which the lever rocks in operating the brake-shoes. It follows that rocking movement of the lever is accompanied by movement of the brake-shoes in opposite directions, respectively. The brake-shoes are normally held in their retracted positions by one or more springs 52, directly connecting the terminals 42 to which they are hooked. This spring resists applying movement of the brake mechanism, and restores the latter to its initial position when the applying force is removed.

The applying force herein is furnished by a plunger, such as a piston 53 mounted to slide in a guide, herein a cylinder 54. The other end of the lever 46 simply rests upon the piston. When, therefore, the plunger is raised, the lever is rocked on its fulcrum, and the brake-shoes are brought into contact with the internal surface of the brake-drum. The rear wheel brakes are preferably generally similar to the front wheel brakes hereinbefore described, and it is therefore deemed unnecessary to describe them in detail, except to say that each of the rear wheels is provided with a hub 55 (see Fig. 1), to which is suitably secured a brake-drum 56, the brake-shoes in this case being actuated by cylinders 57, like unto the cylinders 54 employed for the front wheel brakes. These cylinders are appropriately mounted on the rear axle housing 19.

The invention contemplates the use of a suitable fluid, such as oil or glycerine, for the operation of all four brakes, under the control of a single actuating member conveniently located for operation by the driver. In the present example, the actuating member is a pedal 58 (see Fig. 2), fulcrumed on a pivot 59, which in practice is the clutch shaft. Referring now to Fig. 3, this pedal is suitably connected with a fluid motor, herein comprising a master piston 60 (see Fig. 5) working in a master cylinder 61. The piston and cylinder are pivotally mounted to swing to and fro, accompanying reciprocation of the piston in the cylinder, the latter to this end being provided with a downward extension 62, which, as best shown in Fig. 14, presents axially aligned bosses constituting pivots 63 and 64, which are mounted to turn in bearings 65 and 66 presented by two supporting brackets 67 and 68. Referring now to Fig. 4, the bracket 68 herein is appropriately secured to the transmission and clutch housing 29, as by a bolt 69 extending through a lug 70 at the top of the bracket, while the bottom of the latter presents two laterally extending lugs 71 (see Figs. 3 and 6), which may be secured to said housing by cap-screws or studs 72. The brackets are held in definitely spaced relationship at their upper ends by a spacing sleeve 73 (see Fig. 4), which is interposed between the brackets, and encircles a bolt 74, which extends through the brackets. Referring again to Fig. 14, the lower ends of the brackets are definitely spaced by shoulders 75 and 76, presented by the bosses 63 and 64, respectively. A washer 77, secured to the boss 63 by a cap-screw 78, holds the bracket 67 in proper relationship with the shoulder 75, while a washer 79, secured to the boss 64 by a stud 80, serves to maintain the proper relationship between the bracket 68 and the shoulder 76. Referring now to the upper left-hand portion of Fig. 3, the brackets 67 and 68 are secured as by bolts 81 to a bracket 82, which presents a bearing for the pivot 59 of the brake pedal, and is bolted to the clutch housing.

The piston herein is provided with a piston rod 83 (see Fig. 5), guided by a cylinder head 84 secured to the upper end of the master cylinder. The upper end of the piston rod is pivotally connected to a lever, designated generally by the numeral 85, best shown in Fig. 10, which in turn is connected by a link 86 to the pedal 58. Relative adjustment of these parts herein is conveniently accomplished by making the lever 85 in two parts 87 and 88, both fulcrumed on the sleeve 73, and adjustably connected to each other, as by a stud 89 carried by one of said parts, and extending through a segmental slot 90 provided in the other. A set-screw 91, threaded into a lug 92 on one part of the lever, rests against the other part of the lever, and affords a means of adjustment, while the stud 89 serves to clamp the two parts in the desired position of adjustment. This adjustment enables one to predetermine the timing of the operation of the master piston with respect to related parts, such as the pedal and the pressure booster presently to be described.

The lever 85, piston rod 83, piston 60 and cylinder 61, constitute in effect a toggle, which straightens as the piston descends in the cylinder, and the relative arrangement of the parts is such as to cause a relatively rapid expulsion of the fluid at the commencement of the downward movement of the piston, and a decreasing speed of expulsion later, as the piston continues to descend. The result is that when the brake pedal is depressed, at first the brakes will move rapidly but with comparatively little power, but as the movement progresses, the brakes will be applied with increasing force. A suitable spring 93, herein attached at one end to the pedal (see the upper portion of Fig. 3) and at its other end to an appropriate fixed support 94, constantly tends to restore the pedal and connected parts to the initial position represented in Fig. 3. The adjustment of the lever 85 should be such that the toggle lacks about one-quarter of an inch of reaching a straight-line position when the pedal is fully depressed.

It is important that the system be kept entirely filled with the liquid, otherwise its effectiveness would become impaired by the presence of air, which is compressible, and I have therefore provided replenishing means now to be described, reference being had at first to Figs. 3 and 4. A reservoir 95, adapted to contain a supply of liquid, is suitably supported, as by securing the same to the master cylinder, herein by cap-screws or studs 96, and the reservoir is further supported by providing the same with a downwardly extending arm 97, which, as shown in Fig. 14, has a bearing 98 on the boss 63, the latter being provided with a shoulder 99 serving as an abutment to limit inward movement of the bearing along the boss. It should here be observed that the master cylinder and reservoir are spaced apart (see Fig. 9), and that a portion of the bracket 67 extends between them. The reservoir is provided with a suitable filling cover 100.

Advantage is taken of the movements of the brake pedal to cause oil to be supplied from the reservoir to the master cylinder, in case of loss through any cause, and to boost the pressure in the master cylinder should occasion arise for abnormally high pressure. To this end, I have provided a pump comprising a cylinder 101 (see Fig. 5), having a piston 102 working therein, the latter having a depending rod 103, which is actuated by though disconnected from the brake pedal. The lower end of this piston rod is adapted for cooperation with a lever 104, fulcrumed on a pivot 105 carried by the master cylinder 61 about its pivotal axis, said lever being connected to the pedal by mechanism now to be described, reference being had to Fig. 3. The connection is in the nature of a link, designated generally by the numeral 106, which is pivoted at its upper end to an arm 107, carried by the brake pedal, while the lower end of the link has a lost motion connection with the lever, as by providing the latter with a slot 108, which receives a pin 109 carried by the link. A suitably arranged spring 110, best shown in Figs. 5 and 6, constantly tends to maintain the pin 109 at the upper end of the slot 108. The purpose of this lost motion connection is to permit the booster to be operated by the lever 104 by hand, independently of the brake pedal, this being advantageous when initially filling the system with liquid.

Herein, the lever 104 presents a shank 111 for the convenient attachment of an operating tube or rod for use as a handle when operating the booster manually in filling the system with liquid.

The lever 104 carries an abutment 112 for engagement with the lower end of the booster piston rod 103, this abutment in the present example being conveniently formed as a bolt, extending through the lever and secured thereto by a nut 113. In the normal position of the brake pedal, this abutment is separated from the lower extremity of the booster piston by a space sufficient to permit the operation of the brakes under ordinary conditions, without bringing the booster into action. In practice, the adjustment is usually made so that the abutment 12 engages the lower end of the booster piston-rod 103, and the booster comes into action just before the master piston reaches the end of its down stroke, thereby to afford an abnormal pressure in the system; or, if loss of liquid has occurred, the booster will thereby automatically make up for that loss by drawing on the supply in the reservoir.

In the absence of anything to prevent, it would be perfectly possible for the user to build up in the system an exceedingly high pressure, much greater than could be used to good advantage, and which might subject the system to unnecessary and undesirable stresses. To prevent this undesirable result, I have provided a pressure limiting means incorporated in the link 106 (see Fig. 3). Herein, the link is telescopic, it being made up of a rod 114 working in a sleeve 115, the latter enclosing a compression spring 116. The lower end of this spring rests against an abutment 117 presented by the sleeve, and at its upper end against a nut 118 threaded onto a rod 114. Suitable provision is made to permit this nut to slide longitudinally of the sleeve, but to be held against rotation therein, as by providing the nut with keyways 119 (see Fig. 3ª), which receive keys 120 presented by the sleeve. When, therefore, in the downward movement of the brake pedal the abutment 112 engages the booster piston rod 103, the spring 116 will yield to a greater or less extent, depending upon the strength, and it will impose a limiting effect upon the action of the booster. Adjustment of the strength of the spring can be accomplished by disconnecting the lower end of the link 106 from the lever 104, and turning the rod 114 in the proper direction with relation to the nut 118. The rod should then be reconnected to the lever. The ascent of the sleeve relatively to the nut in opposition to the spring may be limited by a suitable stop, herein a sleeve 121 encircling the rod 114 and resting at its lower end against the abutment 117. The length of this sleeve will be the controlling factor in determining the maximum pressure at the lowest position of the brake pedal by superseding the spring.

The details of the reservoir and the means of communication between the same and the master cylinder will now be described, reference being had at first to Fig. 9. Near the bottom of the reservoir is a strainer 122 for the operating fluid, said strainer being conveniently carried by a clean-out plug 123 threaded into the side of the reservoir. This plug carries a sleeve 124, which is apertured as at 125 to permit the entrance of the operating liquid into its interior, and its inner end is supported in an opening 126, from which a passage 127, best shown in Fig. 7, leads toward the booster cylinder, communication with the lower end of the booster cylinder being by way of passages 128 and 129, shown in Figs. 7 and 8, with a small chamber 130, shown in Fig. 5, at the lower end of the booster cylinder. To permit the flow of the operating liquid from the reservoir through the described passages, but to prevent its flow in the reverse direction, I have provided suitable check valves, herein hollow pistons 131, mounted to slide in guides 132, which present seats 133 for shoulders 134, which are urged toward said seats by springs 135. Each valve presents a lengthwise passage 136, and one or more transverse passages 137, the latter being directly beneath the shoulder 134, whereby when the valve is lifted by the pressure of the liquid, the latter issues from the transverse passages and flows between the seat and the shoulder into a chamber 138 above the valve. Herein, the valve guide 132 is threaded into the reservoir casting, and presents a shoulder 139, which rests against a gasket 140. Removal of the valve assembly is conveniently accomplished by the provision of a plug 142, threaded into the reservoir casting, and presenting a shoulder 143 resting against a gasket 144. To save space, this plug is hollow, it being provided with a chamber 145, into which the valve assembly depends.

Referring again to Fig. 5, liquid thus drawn into the space below the booster piston 102 is transferred to the space above the latter in a manner now to be described. In the first place, the booster piston carries a positively opened valve 146, which is normally seated against a seat 147 presented by the cylinder. This valve is opened by the upward thrust of the lever 104 against the booster piston rod 103. The liquid thus flows through transverse passages 148 and a longitudinal passage 149 to the space above the booster piston, the flow being controlled by a spring-seated check valve 150, which permits the flow of the liquid in an upward direction, but prevents its flow in the opposite direction. A spring 151, interposed between a cylinder head 152 and the booster piston, constantly tends to urge the latter in a downward direction, and consequently tends to cause the oil beneath the piston to flow therethrough to the upper side thereof, whence it flows through a passage 153 into the master cylinder 61. Preferably, the booster piston is provided with a cupped leather washer 154, and the master piston is similarly provided with a cupped leather washer 155.

In the normal operation of the brakes, the lever 104 will not reach the lower end of the booster piston rod 103, and hence the lever will simply rise and fall idly, accompanying movement of the brake pedal. If, however, a loss of oil in the system should occur, or if, under extraordinary circumstances, the operator should wish an abnormally high pressure in the system, the pedal is depressed to an unusual extent, thereby causing the lever 104 to engage the booster piston-rod 103, thus lifting the booster piston and causing the latter to pump liquid into the master cylinder. This operation will be repeated at each stroke of the pedal, if the latter, in being depressed, passes a certain predetermined point.

When, in the operation of the pedal, the master piston descends in its cylinder, there is a natural tendency to expel oil into the upper part of the booster cylinder, and to cause its piston to descend. When this occurs, its descent is limited by the valve 146 bringing up against the seat 147, and this prevents backward flow of the liquid at this point. To prevent leakage of oil about the piston-rod 103, there is provided a packing 156, held under compression by a gland 157, and a sleeve 158 threaded onto the lower end of the cylinder.

The connections between the master cylinder and the brake cylinders will now be described, reference being had at first to Figs. 3 and 4. A flexible conduit 159, helically coiled about the pivotal axis of the master cylinder, communicates with the lower end of the latter, and is attached thereto by an appropriate coupling 160. When, therefore, in the operation of the brakes the master cylinder swings to and fro about its axis, communication between the master cylinder and the pipe lines is maintained by this flexible connection, which simply flexes after the manner of a helically-coiled torsional spring. This avoids the necessity of a swivel joint at this point.

Referring now to Figs. 1 and 2, the conduit 159 is connected by a helically-coiled, flexible conduit 160' to a distributing valve casing 161, having shut-off valves 162 and 163 controlling outlets leading to the front and rear axles, respectively, while another outlet is connected by a conduit 164 to a pressure gage 165, which in practice will be located at a convenient point for observation by the operator, such as on the instrument board. This conduit likewise includes a helically-coiled, flexible portion 166. This gage shows the operator the pressure in the system at any given moment.

The connections leading to the front wheel brakes will now be described, reference being had at first to Figs. 1 and 2. Leading from the valve casing 161 is a conduit 167, which extends along the adjacent side member 22 of the frame, and thence along the cross-member 23 (see Fig. 1) to a fixed fitting 168. This fitting is appropriately connected to a fitting 169 on the front axle by a conduit, including two flexible, helically-coiled connections 170, permitting flexure about generally horizontal parallel axes and a rigid section 171, all of which extend lengthwise of the axle, the arrangement being such that, as the axle and frame move up and down with relation to each other, these connections bend freely and without danger of rupture, because the movement required of them is comparatively slight.

The pipe connections carried by the front axle will now be described, reference still being had to Fig. 13. The fitting 169 is attached to and communicates with a T-fitting 172, which in the present example is conveniently disposed within the hollow axle 18. Branch pipes 173 lead in opposite directions from this T-fitting, and terminate in L-fittings 174, which in turn communicate by way of passages 175 in the axle and 176 in the steering pivots with the brake cylinders 54.

The connections leading to the rear brakes will now be described, reference being had once more to Figs. 1 and 2. Leading from the valve casing 161 is a conduit 177, including two helically-coiled, flexible sections 178 to a branch fitting 179, to whose branches are connected branch conduits 180 which lead to the rear brake cylinders 57. These branches are conveniently supported by diagonal braces 181, which are attached at their forward ends to the torque tube 7, and diverge rearwardly toward the rear axle to which they are attached. When, therefore, the frame and rear axle move up and down with relation to each other, the conduit structures carried thereby are capable of moving with relation to each other by the provision of the flexible sections 178.

In filling the system with liquid, it is of course necessary to release the air that is trapped therein. In the case of the brake cylinders, this is conveniently accomplished by bleeding vents, such as venting plugs 82 shown in Fig. 13, while in the case of the booster cylinder (see Fig. 11), there is a venting passage 183, which leads to a venting plug 184 located at a conveniently accessible point (see the lower central portion of Fig. 4). As soon as the liquid begins to issue from these air vents, they should be closed, and when the entire system, including the reservoir, has been filled, the filling cover 100 is screwed into place. The system should then continue to operate automatically without further attention over a long period of time.

The general operation of the brake system should be evident from the foregoing, without further description, except to say that the brakes are applied by depressing the pedal, which causes the master piston to descend and expel the liquid from the master cylinder through the described connections to the brake cylinders. When the pressure is removed from the brake pedal, the master piston is restored to its initial position by its spring, while the brake levers and pistons are restored to their initial positions by their respective springs. It should now be evident that the fluid system ensures equalization of action of all four brakes, thus affording maximum braking effect while minimizing danger of skidding when the brakes are applied.

Having thus described one embodiment of the invention, but without limiting myself thereto, what I claim and desire by Letters Patent to secure is:

1. In a fluid brake system for vehicles, the combination of a brake; two fluid motors one of which operates the other which in turn operates said brake; one of said motors being pivoted to turn about an axis during its operation; and a conduit connecting said motors and including a flexible section coiled about said axis.

2. In a fluid brake system for vehicles, the combination of a brake; a fluid motor which operates said brake; a master fluid motor; a support on which said master fluid motor is pivoted to turn about an axis during its operation; and a conduit connecting said motors and including a flexible section coiled adjacent said axis and partaking of the turning movement of said master fluid motor about said axis.

3. In a vehicle brake system, the combination of a brake; a brake-operating fluid motor; a master fluid motor operated by the operator of the vehicle for creating a pressure of the fluid in the system; a normally inoperative booster fluid motor for boosting said pressure; and normally inoperative means for limiting the pressure produced by said booster fluid motor.

4. In a vehicle brake system, the combination of a brake; a brake-operating fluid motor; a master fluid motor for creating a pressure of the fluid in the system; a booster fluid motor for boosting said pressure; an actuator for said booster fluid motor; and a connection between said actuator and said booster fluid motor to limit the pressure produced by said booster fluid motor.

5. In a vehicle brake system, the combination of a brake; a brake-operating fluid motor; a master fluid motor operated by the operator of the vehicle for creating a pressure of the fluid in the system; a normally inoperative booster fluid motor for boosting said pressure; and a normally inoperative spring for limiting the pressure produced by said booster fluid motor.

6. In a vehicle brake system, the combination of a brake; a brake-operating fluid motor; a master fluid motor for creating a pressure of the fluid in the system; a booster fluid motor for boosting said pressure; an actuator for said booster fluid motor; and a spring between said actuator and said booster fluid motor to limit the pressure produced by said booster fluid motor.

7. In a vehicle brake system, the combination of a brake; a brake-operating fluid motor; a master fluid motor operated by the operator of the vehicle for creating a pressure of the fluid in the system; a normally inoperative booster fluid motor for boosting said pressure; and means including a normally inoperative spring for predetermining the pressure in said system.

8. In a vehicle brake system, the combination of a brake; a brake-operating fluid motor; a master fluid motor for creating a pressure of the fluid in the system; a normally inoperative booster fluid motor for boosting said pressure; an actuator for said booster fluid motor; and means including a spring to limit the pressure produced by said booster fluid motor during a predetermined portion of the travel of said actuator.

9. In a vehicle brake system, the combination of a brake; a brake-operating fluid motor; a master fluid motor for creating a pressure of the fluid in the system; a booster fluid motor for boosting said pressure; an actuator for said booster fluid motor; means including a spring to limit the pressure produced by said booster fluid motor during a predetermined portion of the travel of said actuator; and means to supersede said spring during the remainder of such travel and to cause the pressure to be raised above such limit.

10. In a vehicle brake system, the combination of a brake; a brake-operating fluid motor; a master fluid motor operated by the operator of the vehicle for creating a pressure of the fluid in the system; a normally inoperative booster fluid motor for boosting said pressure; a normally inoperative spring for limiting the pressure produced by said booster fluid motor, and means for varying the effect of said spring.

11. In a vehicle brake system, the combination of a brake; a brake-operating fluid motor; a master fluid motor for creating a pressure of the fluid in the system; a booster fluid motor for boosting said pressure; an actuator for said booster fluid motor; a spring between said actuator and said booster fluid motor to limit the pressure produced by said booster fluid motor, and means for adjusting said spring to vary its effect on said pressure.

12. In a vehicle brake system, the combination of a brake; a brake-operating fluid motor; a pivoted, brake-operating master fluid motor; a pivoted actuator for said master fluid motor; and operative connections between said actuator and said master fluid motor and including a lever comprising two relatively adjustable parts to vary the normal position of said actuator with relation to said master fluid motor.

13. In a vehicle, the combination of a brake; a brake-operating fluid motor; a master fluid motor for actuating said brake-operating motor; two brackets on opposite sides, respectively, of said master motor; a support to which one of said brackets is secured; a tie-piece connecting said brackets at one point; said master motor being pivotally mounted on said brackets and presenting a tie-piece connecting them at another point; and a pivoted actuator connected to said master motor to actuate and to swing the same on its pivotal mounting.

14. In a vehicle, the combination of a brake; a brake-operating fluid motor; a master fluid motor for actuating said brake-operating motor; a unitary supporting structure comprising two brackets on opposite sides, respectively, of said master motor and on which said master motor is pivotally mounted; a master motor operating lever fulcrumed on and between said brackets; and a support to which one of said brackets is secured.

15. In a vehicle, the combination of a brake; a brake-operating fluid motor; a master fluid motor for actuating said brake-operating motor; a pedal for operating said master motor; and a supporting structure for said master motor and said pedal, said supporting structure having two parts on opposite sides, respectively, of said master motor and on opposite sides, respectively, of said pedal; said master motor being pivoted on said parts; and a third part on which said pedal is pivoted, said third part being secured to and supported by one of said two parts.

16. In a vehicle, the combination of a brake; a brake-operating fluid motor; a master fluid motor for actuating said brake-operating motor; a pedal for operating said master motor; connections including a lever between said pedal and said master motor; and a supporting structure for said master motor, said pedal and said lever, said structure having two parts on opposite sides, respectively, of said master motor and on which said master motor and said lever are pivoted, and a third part on which said pedal is pivoted.

17. In a vehicle brake system, the combination of a brake; a brake-operating fluid motor; a master fluid motor operated by the operator of the vehicle for creating a pressure of fluid in the system; a booster fluid motor for boosting said pressure; and normally inoperative means for imposing a limiting effect on the action of said booster motor.

18. In a vehicle brake system, the combination of a brake; a brake-operating fluid motor; a master fluid motor operated by the operator of the vehicle for creating a pressure of fluid in the system; a booster fluid motor for boosting said pressure; and normally inoperative means including a spring for imposing a limiting effect on the action of said booster motor.

19. In a vehicle brake system, the combination of a brake; a brake-operating fluid motor; a master fluid motor for creating a pressure of fluid in the system; a reciprocating, booster fluid motor for boosting said pressure; an actuator; means connecting said actuator to said master fluid motor; and means presenting a yielding connection between said actuator and said booster motor.

20. In a vehicle brake system, the combination of a brake; a brake-operating fluid motor; a master fluid motor for creating a pressure of the fluid in the system; an actuator for said master fluid motor; a normally inoperative booster fluid motor for boosting said pressure; and means operated by said actuator for limiting the pressure produced by said booster fluid motor.

21. In a vehicle brake system, the combination of a brake; a brake-operating fluid motor; a master fluid motor for creating a pressure of fluid in the system; a normally inoperative booster fluid motor for boosting said pressure; and a spring for limiting the power applied to said booster fluid motor.

In testimony whereof, I have signed my name to this specification.

FREDERICK. S. DUESENBERG.